Nov. 21, 1961    G. W. BAKER ET AL    3,009,334
PORTABLE VEGETABLE COOLING UNIT
Filed July 20, 1959    5 Sheets-Sheet 1

INVENTORS
GEORGE WALTER BAKER
ELWIN J. WATSON
WALTER J. COLOMBO
BY
ATTORNEY

Nov. 21, 1961   G. W. BAKER ET AL   3,009,334
PORTABLE VEGETABLE COOLING UNIT
Filed July 20, 1959   5 Sheets-Sheet 2
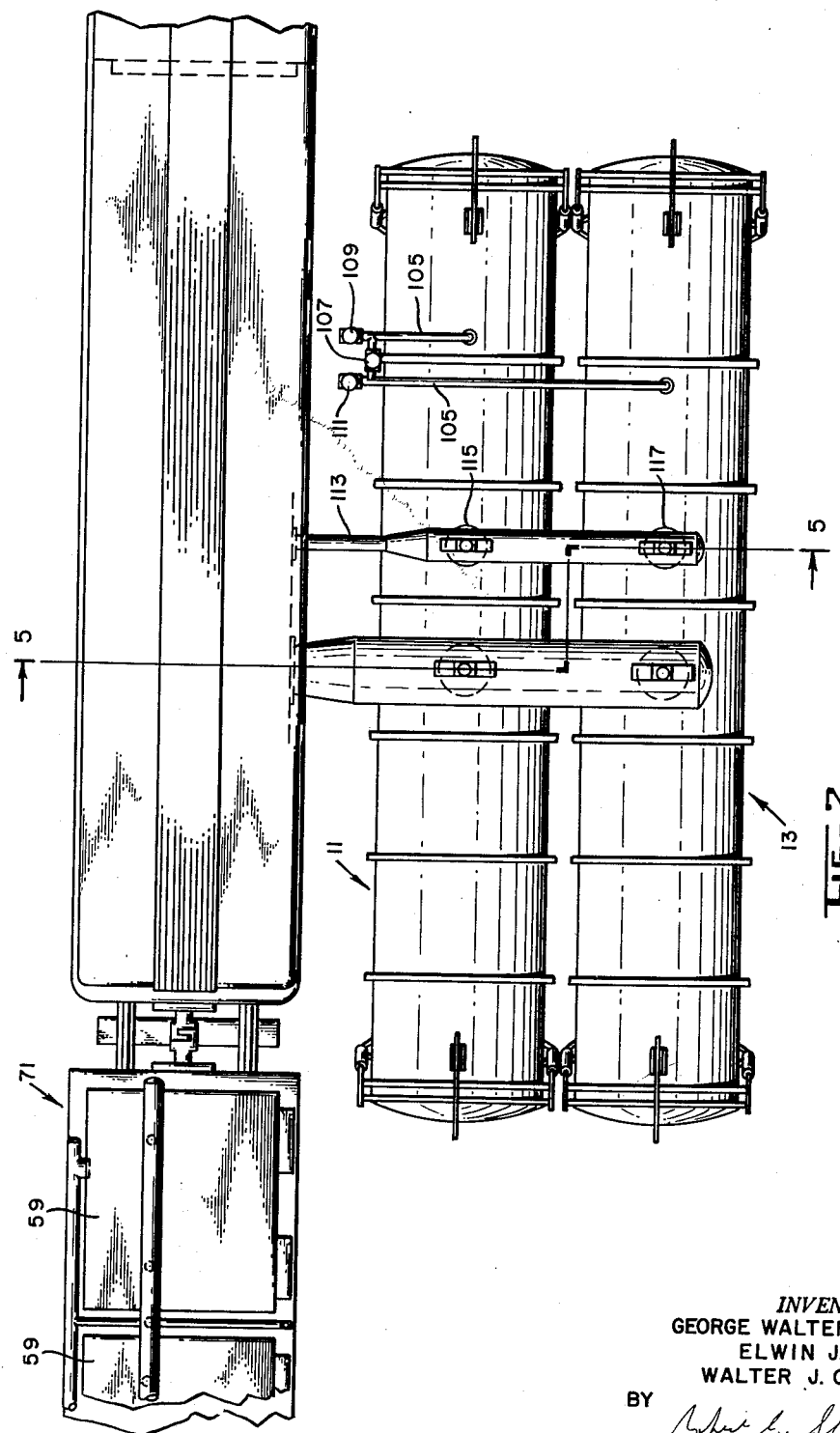
INVENTORS
GEORGE WALTER BAKER
ELWIN J. WATSON
WALTER J. COLOMBO
BY
ATTORNEY

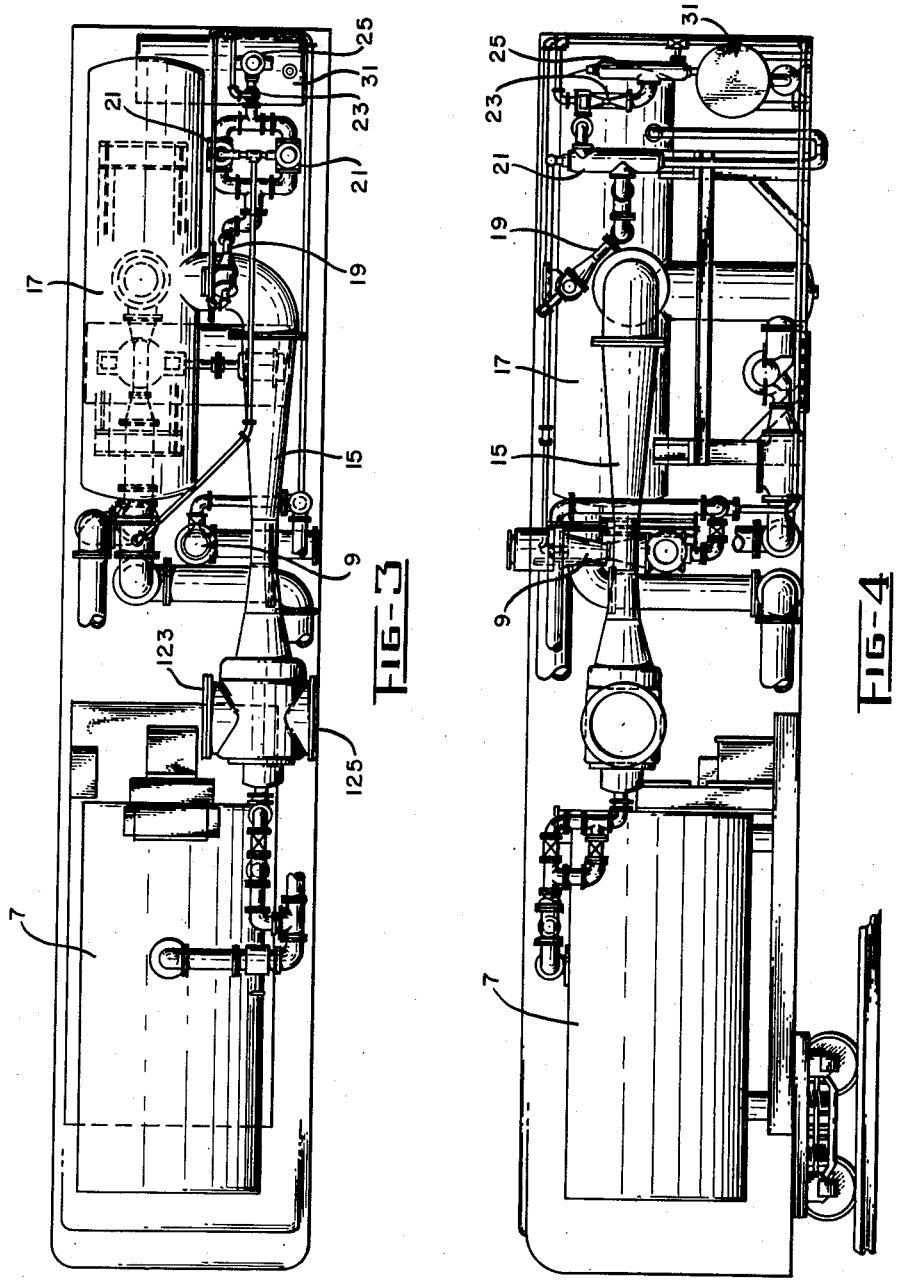

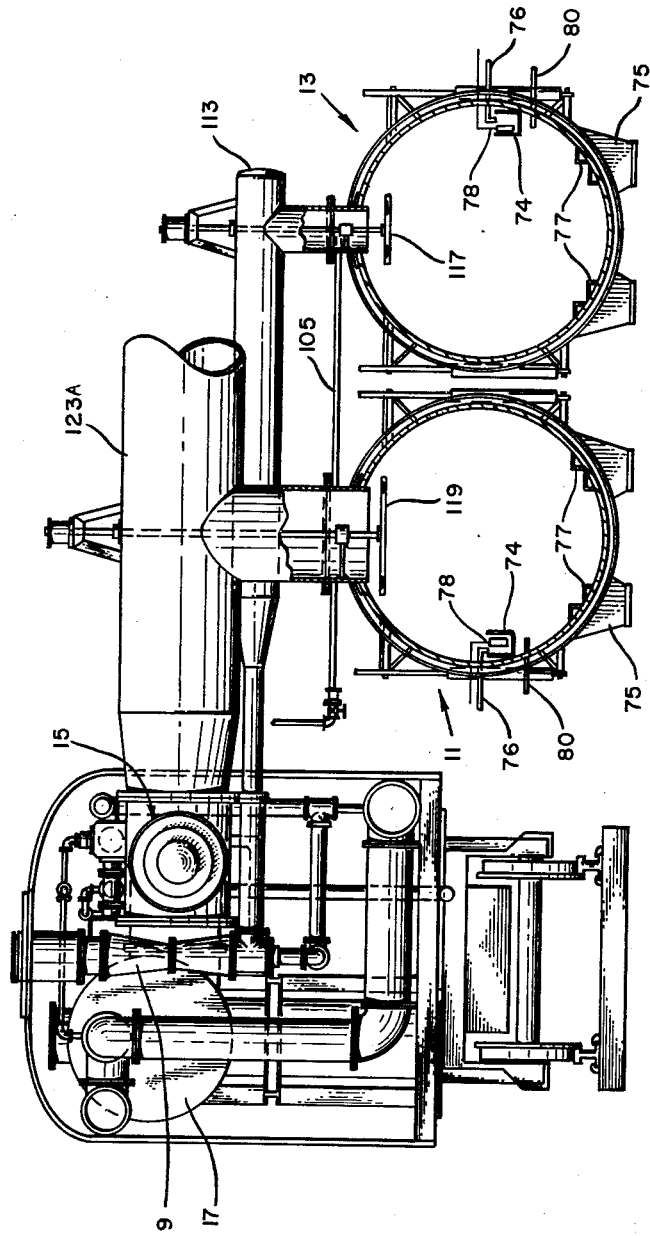

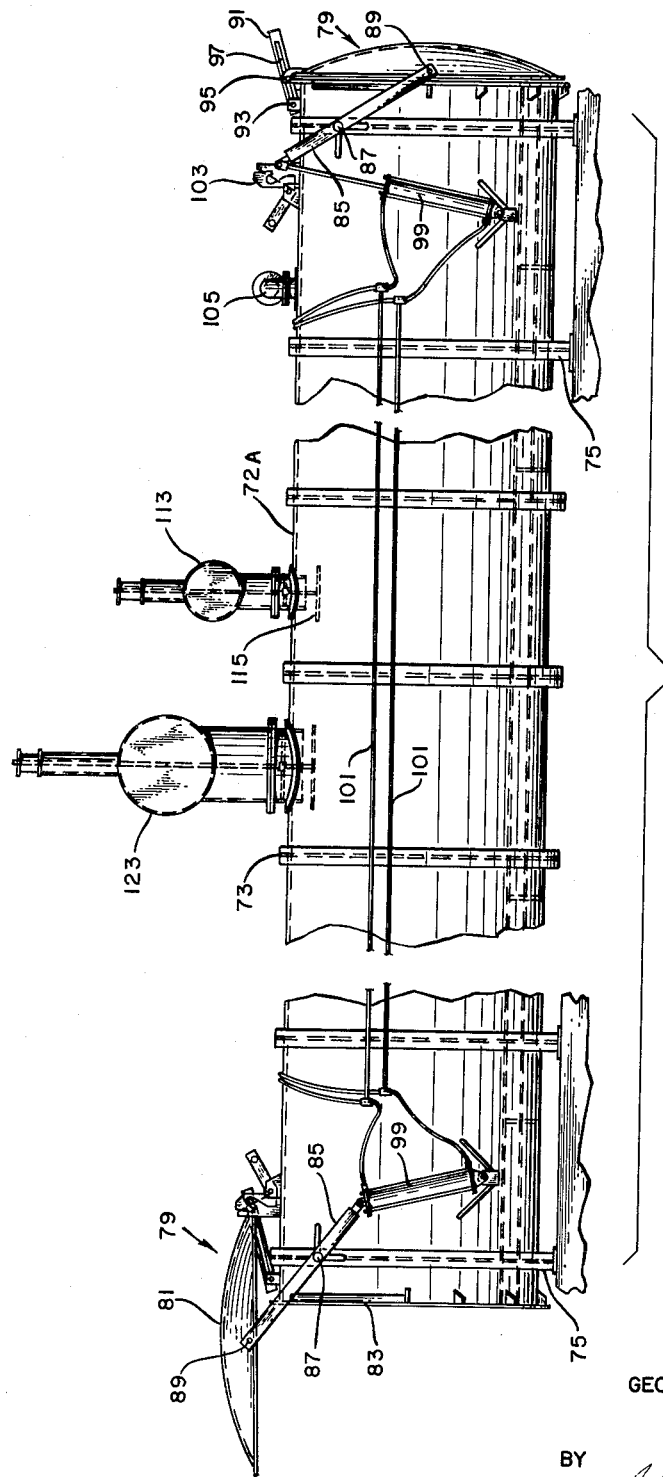

United States Patent Office 3,009,334
Patented Nov. 21, 1961

3,009,334
PORTABLE VEGETABLE COOLING UNIT
George Walter Baker, P.O. Box 1756, El Centro, Walter J. Colombo, Castro Valley, and Elwin J. Watson, Moss Beach, Calif., assignors to said G. Walter Baker
Filed July 20, 1959, Ser. No. 828,181
1 Claim. (Cl. 62—268)

This invention relates to a vacuum cooling unit and more particularly to a portable vacuum cooling unit.

As is well known, many vegetables can be quickly and effectively cooled by placing them in a slightly moist condition in a chamber and drawing a vacuum on the vegetables. In this manner, the heat is extracted from the vegetables from within by the evaporation of the moisture, so that the cooling is quite rapid and effective. If one wished to cool a vegetable, such as crated lettuce, by merely blowing cold air over it, the vegetable matter itself would exert such an insulating effect that a long period of time would be required to accomplish cooling throughout the crate. On the other hand, if a vacuum is drawn on a crate of lettuce, even the interior of the crate is cooled to any desired low temperature in a matter of a few minutes.

Inasmuch as vegetables are a seasonal crop and must be processed in enormous quantities while fresh, it is desirable to provide a unit which can accomplish the cooling very rapidly for a relatively large quantity of the material yet one which can be moved from site to site as different crops come in.

In conventional cooling applications, it is customary to use jet (aspirator) vacuum units which require a relatively long barometric leg. It would be impractical to use such a condenser on a portable device, since the leg itself, up to 34 feet high, would render it impractical for transportation.

When cooling vegetables, it is quite important that the vegetables be cooled to a temperature slightly above freezing but that the vegetables themselves be not subjected to actual freezing conditions since otherwise the quality of the produce would be deteriorated.

It is therefore an object of the present invention to provide a vacuum cooling unit of large capacity but which is also portable so that it can be moved from one harvest site to another.

Another object of this invention is to provide a vacuum cooling unit wherein no barometric leg is necessary and a horizontal direct contact condenser is substituted for the conventional barometric leg.

A further object of this invention is to provide a device wherein the absolute pressure developed within the chamber is accurately controlled, thus obviating the danger of freezing the vegetables being cooled.

Another object of this invention is to provide an accurate indicator of the actual temperature of the vegetable matter within the chamber.

A still further object of this invention is to provide a cooling device having a direct contact horizontal condenser wherein flooding of the condenser is prevented by the use of a float actuated switch.

Another object of this invention is to provide a vacuum cooling unit having a dual suction connection on the booster vacuum unit so that vacuum chambers can be located with equal ease on either side of the vacuum producing unit.

Another object of this invention is to provide a vacuum cooling unit having a simple but effective easy-opening door so that produce can be readily loaded into and removed from the vacuum cooling unit.

Other objects will be apparent from the description of the invention which follows.

In the drawings forming a part of this application:

FIGURE 2 is a plan view of the device of the present invention.

FIGURE 3 is a plan view of the vacuum unit itself with the roof cut away to show the location of the more important units of the device.

FIGURE 4 is a sectional side view of the equipment shown in FIGURE 3.

FIGURE 5 is a section on the lines 5—5 of FIGURE 2.

FIGURE 6 is a side elevation of one of the vacuum chambers.

Figure 1:
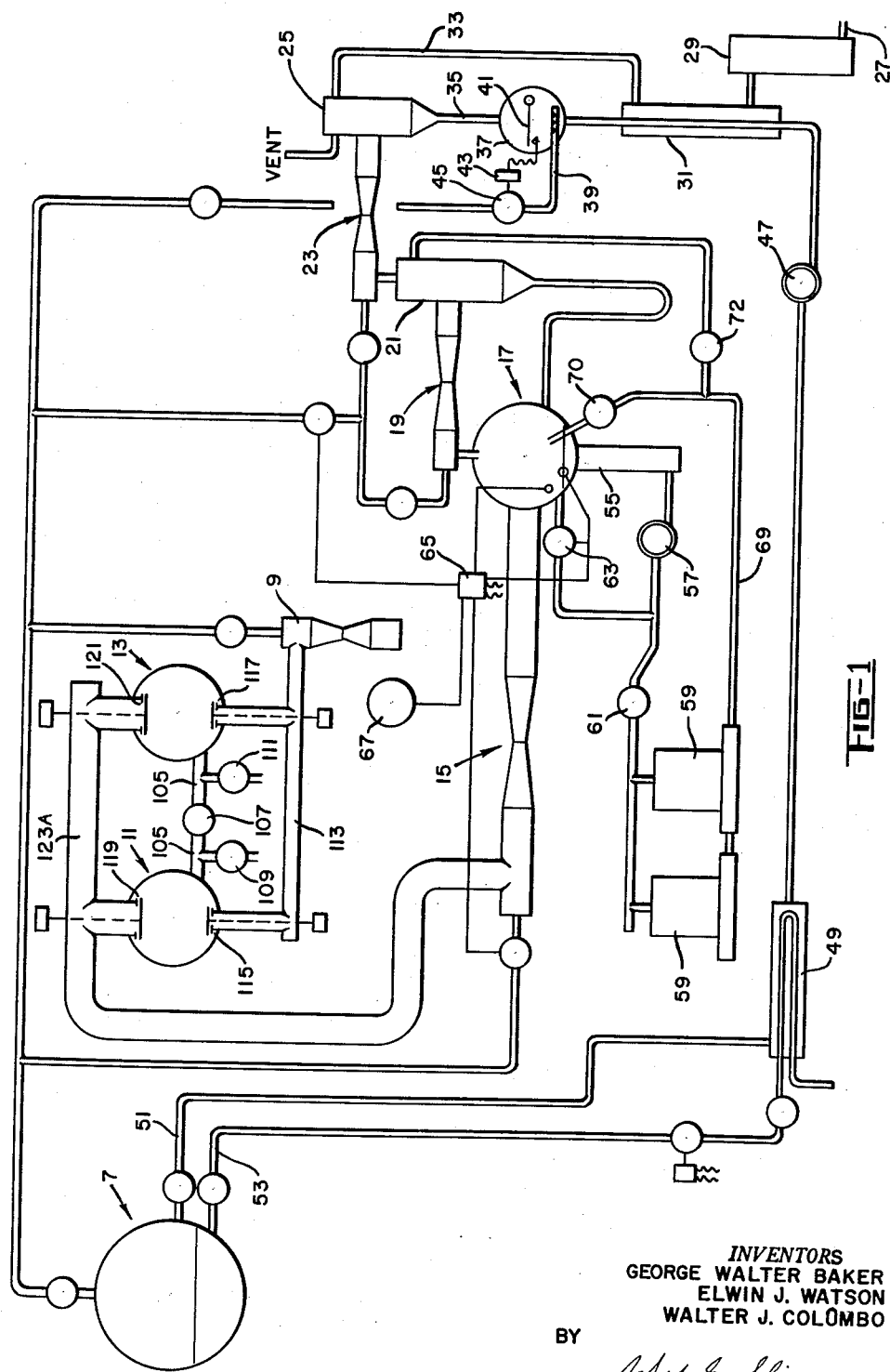
FIGURE 1 is a schematic diagram of the main piping and units used in carrying out the present invention.

Referring now to the drawings by reference characters there is shown a device having a conventional boiler 7, a primer jet pump 9 and two vacuum chambers generally designated 11 and 13. Also shown is a three stage vacuum system, the principal parts of which are a first stage or booster jet 15 having a first stage horizontal condenser 17, a second stage jet 19 having two parallel second stage condensers 21 and a third stage 23 having a third stage condenser 25. Water is taken from a suitable source through line 27, passed through a water softener 29, through the feed water heat exchanger 31, and through line 33 to the third stage condenser 25 where it serves to condense the steam from the jet 23. Water from the condenser 25 is taken through the line 35 into the boiler water feed tank 37 where steam from line 39 is blown through it to deaerate it. This action is controlled by the float valve 41 acting through a suitable control 43 and actuating the valve 45. From the water feed tank 37, the feed water is taken through the heat exchanger 31, through the boiler water feed pump 47, through the blowdown heat exchanger 49 and thence through line 51 to the boiler 7. It will be noted that the boiler is equipped with a blowdown line 53 and that this line also passes through the heat exchanger 49 so that the heat of the water exhausted on blowdown is largely salvaged.

Water from the main condenser 17 is withdrawn through the leg 55 through the circulating pump 57 and then to the cooling towers 59 or the water can be recirculated to the condenser 17 without going through the cooling towers by suitable adjustment of the valves 61 and 63. Normally the operation of these valves is controlled by the level controller 65. The level controller 65 operates from a compressed air source 67. The valves 70 and 72 are used to control the amount of water going to condensers 17 and 21.

Normally, the water circulates over the towers 59 and is returned to the condenser 17 through the line 69. The cooling towers 59 are quite large in size and are mounted on a separate railroad car 71 as is shown in FIGURE 2.

In one practical embodiment of the invention, the vacuum cooling chambers 11 and 13 are each about 48 feet long and about 7½ feet in diameter. The chambers consist of a cylindrical shell 72A suitably of steel and provided with a number of reinforced members 73. Obviously, the chambers 11 and 13 must be strongly made in order to resist a pressure of approximately 15 pounds per square inch. The chambers can be individually transported from place to place and are provided with suitable support members 75. Mounted within the chamber are two or more sets of parallel rails 77 so that wheeled dollies can be used for transporting the vegetables to be cooled into and out of the chambers. Both ends of each of the chambers are equipped with doors 79 which are mechanically actuated and which open in such a manner that no obstruction is left at the door of the chamber. The door proper comprises a generally convex member 81 which fits tightly against a suitable gasket 83 on the end of the chamber. The doors are equipped with a double hinge arrangement which is provided by the bars 85 which are hinged at 87 and fastened to the doors at point 89. Another bar 91 is pivoted at 93 and the top of the door is equipped with an extension 95 which is free to slide in a slot 97 of the bar 91. To actuate the doors, two air cylinders 99 are employed on each side of the door which are provided with air from lines 101 from a source, now shown, through suitable control mechanism. If desired, the doors can be latched open by means of a latch 103 so it is not necessary to apply pressure continuously to hold the doors open.

Each of the chambers 11 and 13 is provided with three valved connections. The smallest of the openings is that provided by the vacuum breaking and equalizing line 105. The vacuum equalizing line has a valve 107 in the middle thereof and in addition, has two branches with valves 109 and 111 thereon. The purpose of this line is two-fold. The chambers 11 and 13 are used alternately. In other words, a vacuum is being drawn on one chamber while the other chamber is being emptied and refilled. When it is time to discharge the contents of the chamber under evacuation, say 11, and the other chamber 13 is filled with material but not evacuated, the doors of the chamber 13 are closed and the valve 111 is closed. Of course, since there is a vacuum on the chamber 11, the valves 109 and 107 are already closed. The valve 107 is then momentarily opened and the pressure therefore equalized between the chambers 11 and 13, thus applying a substantial amount of vacuum to the chamber 13 so that it is not necessary to extend so much energy in bringing down the pressure in this chamber. The valve 107 would then be closed and the regular vacuum system used to finish the evacuation of the chamber 13. At the same time, the valve 109 would be opened momentarily to break the vacuum on chamber 11, permitting the doors to be opened. Of course, the cycle would be reversed when it is time to discharge the contents from the chamber 13.

Connected to the primer jet 9 is the header 113. The header 113 is equipped with two valves designated 115 and 117. One of the valves 115 and 117 go to each of chambers 11 and 13, respectively, and it will be apparent that by alternately opening and closing the valves 115 and 117 the vacuum produced by the jet 9 can be applied to either the chamber 11 or 13. It will be noted that the vacuum jet 9 is of relatively small size as is the header 113. The reason for this is that this jet is used as only a primer and brings the vacuum down to about 2 inches of mercury absolute pressure. At this pressure, there has been no substantial evaporation of water within the chamber so that this pump and manifold need only handle a volume of air roughly corresponding to that within one of the chambers. When the highest practical vacuum has been attained with the jet pump 9, the valve 115 or 117, depending upon which chamber is being evacuated, is closed and the mating valve 119 or 121 is opened. This applies the main high vacuum through the three stage vacuum system, heretofore described, operating through the manifold 123A to the vacuum chamber 11 or 13 being evacuated. The pressure is now brought down to the desired degree, ordinarily on the order of a fraction of an inch of mercury. When the vacuum is brought down to the desired point, the valve 119 or 121 is then closed. This completes one cycle and the device is now ready for a repetition of the cycle with the opposite chamber.

For the purpose of measuring the actual temperature within the chamber, a tray 74 is provided with a line 76 through which water can be bled into the tray. A thermocouple 78 is provided under the surface of the water and this will indicate the actual temperature within the chamber.

A line 80 can be provided within the chamber, leading to a suitable pressure measuring instrument, not illustrated, for determining the absolute pressure within the chamber. The absolute pressure can be used to control the degree of cooling.

All of the equipment with the exception of the cooling towers and the vacuum chambers are mounted on one end of a single railroad car. The cooling towers are mounted on a separate flat car while the vacuum chambers proper 11 anrd 13 are ordinarily transported separately and placed on a temporary foundation at the operating site.

Some operating locations require that the cooling chambers be on one side of the railroad car referred to hereinafter as an elongated generally rectangular movable housing while in other locations it is more convenient to have the chambers on the opposite side of the car. Since the first stage or booster jet 15 is a very large and cumbersome piece of equipment, it has been provided with a double set of flanges designated 123 and 125. A corresponding blind flange can be placed on one side of the device while the header 123A is placed on the other. Thus, it is simple to set up the equipment on either side of the car. The other piping, being smaller, presents no particular problem.

We claim:

An elongated portable system siutable for attachment at either lateral side thereof to a fixed cooling chamber suitable for receipt of vegetables to be cooled, said portable system comprising: an elongated generally rectangular moveable housing; first means at either lateral side of said housing for joining a first manifold thereto, said first means at either lateral side being directed horizontally, whereby a horizontal manifold pipe may be directly secured thereto; means for sealing either side of said first mentioned means when a manifold is connected to the other side thereof; a steam boiler mounted in said housing, said boiler being in communication with said first mentioned means whereby steam may be supplied to said means; a three-stage steam ejection and condenser system consisting of a series of steam ejectors and condensers mounted in the said moveable housing, the first stage of said three-stage steam ejection system being in direct communication with the interior of the said first mentioned means, each of the remaining two stages thereof being in series with the said first stage; parallel means joining said boiler and each of the said three stages for supplying steam individually thereto; water cooling means mounted in the said moveable housing and means joining the said water cooling means to each of the said three condensers of each of the said three stages for supplying cooled water to each of the said three condensers; and a primer steam ejector mounted in the said housing, the said primer steam ejector being provided with means for conveying steam from the said boiler to the said primer ejector and having means thereon for placing the said primer ejector in communication with a second manifold of the said fixed cooling chamber.

References Cited in the file of this patent
UNITED STATES PATENTS

| | | |
|---|---|---|
| 2,064,609 | Humble | Dec. 15, 1936 |
| 2,344,151 | Kasser | Mar. 14, 1941 |
| 2,767,556 | Robinson et al. | Oct. 23, 1956 |
| 2,770,111 | Rear | Nov. 13, 1956 |
| 2,785,216 | Winner | Mar. 12, 1957 |
| 2,883,344 | McKinney | Apr. 21, 1959 |